(12) United States Patent
Radke et al.

(10) Patent No.: US 7,444,579 B2
(45) Date of Patent: Oct. 28, 2008

(54) NON-SYSTEMATIC CODED ERROR CORRECTION

(75) Inventors: William H. Radke, San Francisco, CA (US); Shuba Swaminathan, Los Gatos, CA (US); Brady L. Keays, Half Moon Bay, CA (US)

(73) Assignee: Micron Technology, Inc., Boise, ID (US)

(*) Notice: Subject to any disclaimer, the term of this patent is extended or adjusted under 35 U.S.C. 154(b) by 527 days.

(21) Appl. No.: 11/116,560

(22) Filed: Apr. 28, 2005

(65) Prior Publication Data

US 2006/0248434 A1    Nov. 2, 2006

(51) Int. Cl.
    *G11C 29/00* (2006.01)
(52) U.S. Cl. .................................. 714/763
(58) Field of Classification Search ............ 714/763, 714/764, 755
    See application file for complete search history.

(56) References Cited

U.S. PATENT DOCUMENTS

| | | | |
|---|---|---|---|
| 5,077,737 A | 12/1991 | Leger | |
| 5,754,567 A | 5/1998 | Norman | |
| 5,787,484 A | 7/1998 | Norman | |
| 5,815,458 A | 9/1998 | Chevallier | |
| 5,854,800 A | 12/1998 | Thomann | |
| 5,864,569 A | 1/1999 | Roohparvar | |
| 5,910,921 A | 6/1999 | Beffa | |
| 5,923,682 A | 7/1999 | Seyyedy | |
| 5,925,138 A | 7/1999 | Klein | |
| 5,935,258 A | 8/1999 | Klein | |
| 6,034,891 A | 3/2000 | Norman | |
| 6,076,182 A | 6/2000 | Jeddeloh | |
| 6,112,314 A | 8/2000 | Norman | |
| 6,178,537 B1 | 1/2001 | Roohparvar | |
| 6,279,072 B1 | 8/2001 | Williams | |
| 6,493,799 B2 | 12/2002 | Pawlowski | |
| 6,601,211 B1* | 7/2003 | Norman | 714/773 |
| 6,728,825 B1 | 4/2004 | Norman | |
| 6,741,253 B2 | 5/2004 | Radke | |
| 6,838,331 B2 | 1/2005 | Klein | |
| 6,870,774 B2 | 3/2005 | Roohparvar | |
| 6,906,691 B2 | 6/2005 | Park | |
| 6,948,026 B2 | 9/2005 | Keays | |
| 6,959,412 B2* | 10/2005 | Silvus et al. | 714/778 |
| 2003/0115538 A1 | 6/2003 | Derner | |

* cited by examiner

*Primary Examiner*—Shelly A Chase
(74) *Attorney, Agent, or Firm*—Leffert Jay & Polglaze, P.A.

(57) ABSTRACT

Improved memory devices, circuitry, and data methods are described that facilitate the detection and correction of data in memory systems or devices by encoding the data bits of a memory row or block in a non-systematic ECC code. This allows memory embodiments of the present invention to utilize reduced complexity error detection and correction hardware and/or routines to efficiently detect and correct corrupted user data in a segment of memory, such as a sector, word line row, or erase block. Additionally, in embodiments of the present invention user data is not stored in a plaintext format in the memory array, allowing for an increased level of data security. Further, in embodiments of the present invention, the ECC code is distributed throughout the stored data in the memory segment, increasing the robustness of the ECC code and its resistance to damage or data corruption.

42 Claims, 8 Drawing Sheets

NON-SYSTEMATIC CODED ERROR CORRECTION

TECHNICAL FIELD OF THE INVENTION

The present invention relates generally to integrated circuits and in particular the present invention relates to data management of Flash memory devices.

BACKGROUND OF THE INVENTION

Memory devices are typically provided as internal storage areas in the computer. The term memory identifies data storage that comes in the form of integrated circuit chips. There are several different types of memory used in modern electronics, one common type is RAM (random-access memory). RAM is characteristically found in use as main memory in a computer environment. RAM refers to read and write memory; that is, you can both write data into RAM and read data from RAM. This is in contrast to read-only memory (ROM), which permits you only to read data. Most RAM is volatile, which means that it requires a steady flow of electricity to maintain its contents. As soon as the power is turned off, whatever data was in RAM is lost.

Computers almost always contain a small amount of ROM that holds instructions for starting up the computer. Unlike RAM, ROM cannot be written to. An EEPROM (electrically erasable programmable read-only memory) is a special type non-volatile ROM that can be erased by exposing it to an electrical charge. EEPROM comprise a large number of memory cells having electrically isolated gates (floating gates). Data is stored in the memory cells in the form of charge on the floating gates. Charge is transported to or removed from the floating gates by specialized programming and erase operations, respectively. Other types of non-volatile memory include, but are not limited to, Polymer Memory, Ferroelectric Random Access Memory (FeRAM), Ovionics Unified Memory (OUM), and Magnetoresistive Random Access Memory (MRAM).

Yet another type of non-volatile memory is a Flash memory. A Flash memory is a type of EEPROM that is typically erased and reprogrammed in blocks instead of one byte at a time. A typical Flash memory comprises a memory array, which includes a large number of memory cells. Each of the memory cells includes a floating gate field-effect transistor capable of holding a charge. The data in a cell is determined by the presence or absence of the charge in the floating gate. The cells are usually grouped into sections called "erase blocks." The memory cells of a Flash memory array are typically arranged into a "NOR" architecture (each cell directly coupled to a bitline) or a "NAND" architecture (cells coupled into "strings" of cells, such that each cell is coupled indirectly to a bitline and requires activating the other cells of the string for access). Each of the cells within an erase block can be electrically programmed in a random basis by charging the floating gate. The charge can be removed from the floating gate by a block erase operation, wherein all floating gate memory cells in the erase block are erased in a single operation.

Each erase block of a Flash memory device typically contains user data areas and overhead data areas. The overhead data areas contain overhead information for operation of the erase block and/or the user data area the overhead data space is associated with. Such overhead information typically includes, but is not limited to, erase block management (EBM) data, sector status information, or an error correction code (ECC). In some Flash memory devices each erase block is divided into a series of logical sectors, where the logical sectors each generally contain 512 bytes of user data space and an associated control or overhead area. One or more of the logical sectors are each typically written to a single row of the Flash memory array (also known as a physical page) within the erase block.

ECC's allow errors in the data stored in the non-volatile memory to be detected and in many cases corrected. ECC's include block codes, that are associated with a block of stored data, and stream codes, that are typically utilized with streams of transmitted data. ECC's include, but are not limited to, Hamming codes, Reed-Solomon (R-S) codes, Bose-Chaudhuri-Hochquenghem (BCH) codes, circular redundancy codes (CRC-32), Golay codes, Reed-Muller codes, Goppa codes, and Denniston codes. In most memories and memory systems, error detection is accomplished via a dedicated ECC check hardware as the data is read out. Error correction is more difficult and typically requires an involved time consuming algorithmic process. As a result, error correction of any data that has detected as corrupt is generally done by a microprocessor or specialized hardware.

The prevalence of errors in modern memory devices, and in non-volatile and Flash memory devices in particular, are increasing with smaller device sizes, increased array density, and lower operating voltages. In addition, the increased active usage with frequent writes of non-volatile memory devices in electronic devices has tended to increase the incidence of operationally induced failures in these devices over long periods of active use due to physical damage, impurity migration, write fatigue, electrical transients, etc.

A problem with non-volatile memories, and Flash memories in particular, is that each erase block physical row page stores the user data before the overhead information, which includes the error correction codes (ECC codes), in each logical sector or row page. Because of this, an error in one or more physical row pages of an erase block can also affect the overhead data associated with those sectors. This increases the likelihood of a loss of data if the ECC is damaged when a localized error to the overhead data area happens. Furthermore, as a result of this ECC encoding method, the user data is placed directly on the memory system or device in an un-encoded/plaintext mode. This may inadvertently allow access to the stored user data.

In addition, the ECC generation/checking hardware of many Flash memory devices and memory systems tends to be complex and consume a large amount of space on an integrated circuit die where it is implemented.

For the reasons stated above, and for other reasons stated below which will become apparent to those skilled in the art upon reading and understanding the present specification, there is a need in the art for improved ECC apparatus and methods that are less susceptible to localized damage to the stored ECC codes and allow for storage of data in encoded non-plaintext formats.

SUMMARY OF THE INVENTION

The above-mentioned problems with localized damage to stored ECC codes and storage of data in encoded non-plaintext formats in non-volatile memory systems or devices and other problems are addressed by the present invention and will be understood by reading and studying the following specification.

Memory devices, control circuitry, or data handling routines, in accordance with embodiments of the present invention, facilitate the detection and correction of data in memory systems or devices by encoding the data bits of a memory row or block in a non-systematic ECC encode. This allows memory embodiments of the present invention to utilize reduced complexity error detection and correction hardware and/or routines to efficiently detect and correct corrupted user data in a segment of memory, such as a sector, word line row, or erase block. Additionally, embodiments of the present invention enable user data to be ECC encoded such that the user data is placed directly in the memory system or device in an encoded/non-plaintext mode. This prevents the stored user data from being placed unencrypted in the memory array so that it can be inadvertently disclosed, allowing for an increased level of data security. Further, in embodiments of the present invention, the ECC code is distributed throughout the stored data in the memory segment, increasing the robustness of the ECC code and its resistance to damage or data corruption.

For one embodiment, the invention provides a memory system comprising at least one memory device, wherein the at least one memory device contains a memory array with a plurality of memory cells arranged in one or more data segments, a memory control circuit coupled to the at least one memory device. The memory control circuit comprising a data buffer, a host transfer circuit coupled to the data buffer, and an ECC generator/checker circuit, wherein ECC generator/checker circuit is adapted to receive and decode a non-systematic ECC encoded data segment from the at least one memory device and output to the data buffer. Wherein the memory system is adapted to detect and correct errors in the non-systematic ECC encoded data segment as it is read from the at least one memory device.

For another embodiment, the invention provides a memory device comprising a memory array containing a plurality of memory cells arranged into a plurality of segments, a data buffer, a host transfer circuit coupled to the data buffer, an ECC generator/checker circuit, wherein ECC generator/checker circuit is adapted to receive and decode a non-systematic ECC encoded data segment from the memory array and output to the data buffer, and wherein the memory device is adapted to detect and correct errors in the non-systematic ECC encoded data segment as it is read from the memory array.

For yet another embodiment, the invention provides a memory controller comprising a host interface, a memory device interface for one or more memory devices, wherein each of the one or more memory devices has a plurality of segments, a data buffer coupled to the memory device interface, a host transfer circuit coupled to the data buffer and to the host interface, an ECC generator/checker circuit, wherein ECC generator/checker circuit is adapted to receive and decode a selected non-systematic ECC encoded data segment from the at least one memory device and output to the data buffer, and wherein the memory controller is adapted to detect and correct errors the selected non-systematic ECC encoded data segment as it is read from the at least one memory device.

For a further embodiment, the invention provides a method of operating a memory controller comprising receiving a non-systematic ECC encoded data segment from a selected memory device of one or more memory devices, and error checking and un-encoding the non-systematic ECC encoded data segment.

For yet a further embodiment, the invention provides a method of encoding a data segment comprising encoding a data segment with a non-systematic ECC code to generate a non-systematic ECC encoded data segment.

For another embodiment, the invention provides a method of decoding a data segment comprising decoding and error checking a data segment encoded with a non-systematic ECC code.

For yet another embodiment, the invention provides a method of encoding a data segment with a transform matrix comprising inputting a data segment into a non-systematic ECC transform matrix to output a non-systematic ECC encoded data segment.

Other embodiments are also described and claimed.

DETAILED DESCRIPTION OF THE INVENTION

Figure 1:
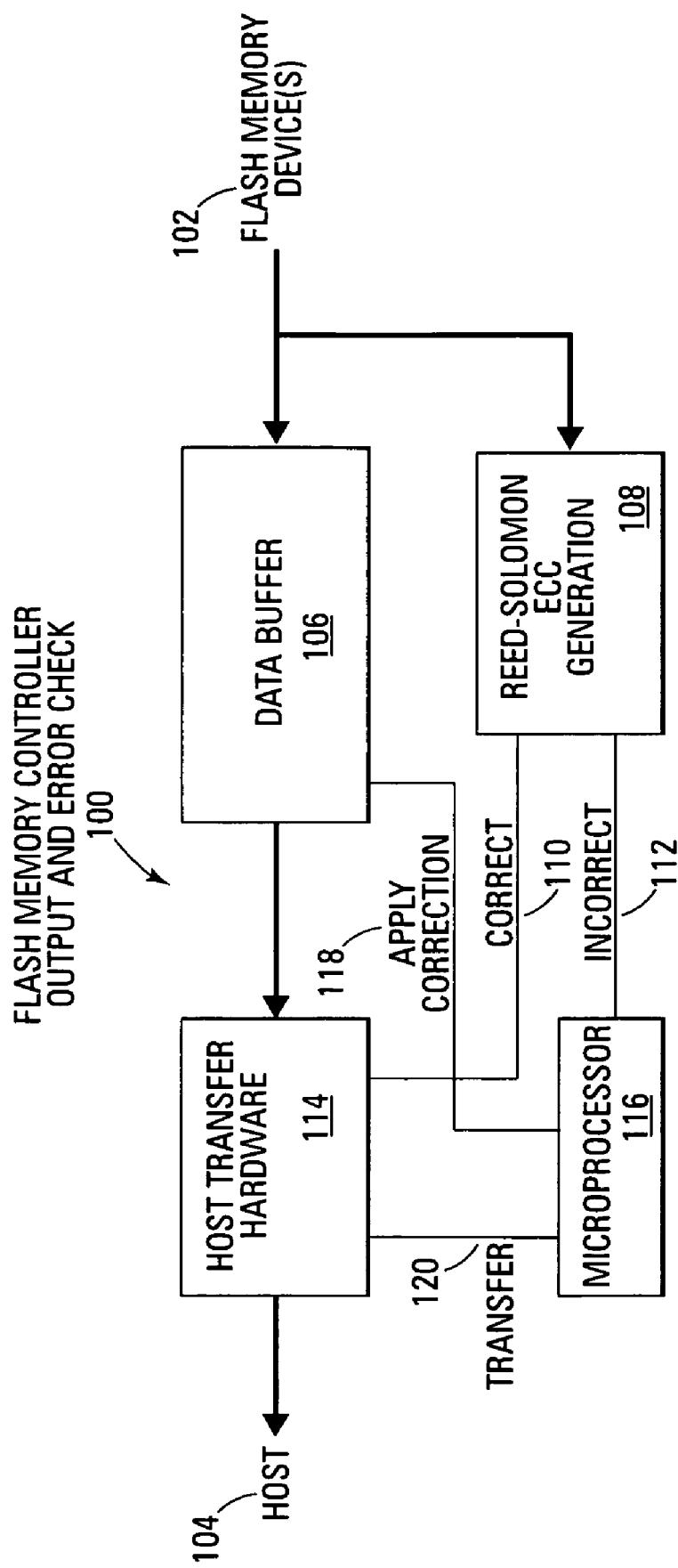
FIG. 1 details a prior art Flash memory controller output with ECC error check and correction circuits.

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof.

Memory devices, control circuitry, or data handling routines, in accordance with embodiments of the present invention, facilitate the detection and correction of data in memory systems or devices by encoding the data bits of a memory row or block in a non-systematic ECC code. In particular, in non-volatile memory devices, such as Flash memory systems and devices. This allows memory embodiments of the present invention to utilize reduced complexity error detection and correction hardware and/or routines to efficiently detect and correct corrupted user data in a segment of memory, such as a sector, word line row, or erase block. Additionally, embodiments of the present invention enable user data to be ECC encoded such that the user data is placed directly in the memory system or device in an encoded/non-plaintext mode. This prevents the stored user data from being placed unencrypted in the memory array so that it can be inadvertently disclosed, allowing for an increased level of data security. Further, in embodiments of the present invention, the ECC code is distributed throughout the stored data in the memory segment, increasing the robustness of the ECC code and its resistance to damage or data corruption.

As stated above, memories typically utilize ECC codes to detect errors in read data, ECC codes also allow for correction of a limited number of these errors. ECC codes, and block ECC codes in particular, are commonly based on specialized polynomial equations, where the stored ECC codes are the generated coefficients of the polynomial for the current data. When the data is read out of a memory, the data integrity is checked by regenerating these coefficients from the read data. If the regenerated and stored ECC codes do not match, an error has been detected. In modern ECC block codes, this typically involves serially running the read data through a hardware ECC generator/checker to regenerate the ECC code, and comparing them against the coefficients in the stored ECC code. In these ECC codes, the read data segment is stored in an un-encrypted/plaintext form in the memory and the ECC code is stored at the end of the read data segment or in a separate overhead data area.

Most modern ECC codes are systematic; in encoding a data segment with an ECC code, the k-bits of the originally input data segment are output unchanged in the output of n-bits, along with generated ECC in the remaining n-k bits. In decoding/checking a data segment with an ECC attached, the data segment containing the original data is read along with the stored ECC, the ECC codes are regenerated and compared against the stored ECC. In decoding/checking a data segment with an ECC attached, the data segment containing the encoded original data and embedded ECC is read, the read data segment is decoded and ECC codes are regenerated and compared against the stored embedded ECC codes.

Once an error in read data is detected, the transfer of the data out of the memory device or system is halted and ECC correction algorithm is started. The ECC correction algorithm, generally speaking, solves for the zeros of the polynomial to locate the data word(s) and bit(s) within the data words that need to be corrected. In doing this, two separate pieces of information (ECC codes) are typically required to allow the ECC algorithm to solve for each single bit error, allowing the algorithm to solve for a byte location and a bit location bitmask to XOR to correct the corrupted bit. Thus for each 2 ECC block codes the ECC block code algorithms are typically able to correct a single bit error in a segment of read data.

Embodiments of the present invention utilize non-systematic ECC encoding and codes. In non-systematic ECC encoding an n-bit data segment is generated that differs from the original k-bit data segment (does not contain the original k input bits in the n-bit output) and encodes the original k data bits within the n-bit output data segment along with an embedded ECC code (the n output bits may be functions of more than one of the k input bits). Unlike systematic ECC encoding, in a stored non-systematic ECC encoded data segment, the original data cannot be directly accessed without going through a decoding process. The ECC codes are also generally encoded in a distributed fashion in the stored non-systematic ECC encoded data segment.

Reed-Solomon error correction block codes are one of a number of block codes commonly utilized in memory device applications. As stated above, with a block code generator, a block of data is fed into the block code generator to generate the ECC code to be stored associated with the data block in the memory device. In implementation in embodiments of the present invention, a Reed-Solomon code generator is fed a data block (a data sector) of 512 bytes and generates six 10-bit symbols that form the ECC code to tag on to the end of the data block. From these six symbols of the ECC code it is possible to detect errors in the data block as it is read from the memory device, and, in one embodiment of the present invention, correct for 3 randomly corrupted single data bits or 3 "bit-pairs" (bit-pair's are the adjacent bits of a data byte grouped as 76 54 32 10, where 7 to 0 are the bit positions in the byte).

A memory embodiment of the present invention utilizes non-systematic ECC hardware and/or routines to detect and correct errors in data segments or blocks. This non-systematic ECC circuitry and/or method facilitates the utilization of non-systematic ECC encoding in the data block or segment being encoded for storage or being read from the memory. This allows for a potentially reduced complexity ECC code generator/data checker hardware over a prior art systematic ECC code generator/data checker. The data segment/block/sector, once encoded, is in an encrypted form with the ECC coding typically distributed throughout the encoded data segment. This allows for data to be stored in a non-plaintext format, increasing the security thereof, and distributing the ECC throughout the encoded data segment, increasing the robustness of the stored ECC to any possible ECC code corruption. In one embodiment, the non-systematic ECC encoding provides better end-to-end ECC protection in a system or a memory system, allowing correction of an error that occurs as the data segment is being read or transferred within the system/memory system and not just those occurring within the memory array. In another embodiment of the present invention, the non-systematic encoding allows for the storage of a smaller amount of data (an overall smaller encoded data segment) than in a systematically encoded counterpart.

FIG. 1 shows a simplified diagram of a memory controller output 100 of the prior art coupled through a memory interface 102 to one or more Flash memory devices and through a host interface 104 to an external host (not shown), which typically is a processor or computer system. In the memory controller 100, a data buffer 106 is coupled to serially receive and hold a selected data block that is serially read through the memory interface 102 from a selected Flash memory device before it is transferred from the data buffer 106 through the host interface 104 under control of the host transfer hardware 114. The serially streamed data block is also coupled to a Reed-Solomon ECC generator/checker hardware 108, which regenerates the ECC codes from the data block and checks them against the stored ECC codes attached at the end of the data block stream. Once the data block is read and evaluated, the Reed-Solomon ECC generator/checker hardware 108 signals 110 to the host transfer hardware 114 to start the data transfer if the data block is correct (the data block ECC codes have been generated and evaluated correctly against the stored ECC codes for the data block, typically generating a string of zeros from the Reed-Solomon ECC generation hardware 108). If the data block is corrupted (the generated data block ECC codes have evaluated incorrectly against the stored ECC codes for the data block, typically generating a non-zero value in string of zeros output from the Reed-Solomon ECC generation hardware 108) the Reed-Solomon ECC generator/checker hardware 108 signals 112 a (typically internal) microprocessor or dedicated ECC correction hardware 116 to correct the errors by utilizing a Reed-Solomon ECC correction algorithm. The microprocessor 116 solves the Reed-Solomon polynomial to determine the bits to be corrected in the data block and applies the correction 118 to the data block contents held in the data buffer 106. After applying the correction to the data buffer 106, the microprocessor 116 signals 120 the host transfer hardware 114 to begin transferring the data block from the data buffer 106 out through the host interface 104.

Figure 2A:
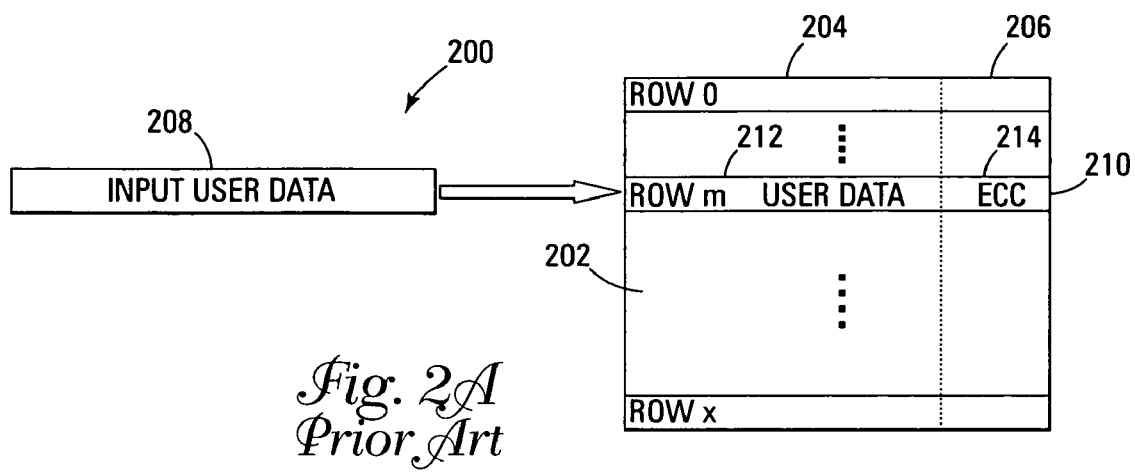
FIGS. 2A and 2C detail prior art encoding of user data into a sector of a Flash memory array.
Figure 2B:
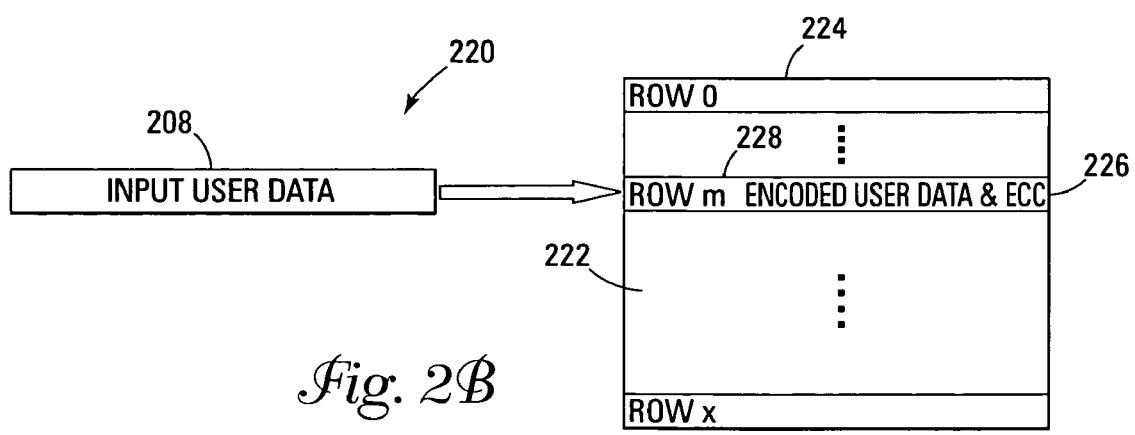
FIGS. 2B and 2D detail encoding of user data into a sector of a Flash memory array in accordance with embodiments of the present invention.
Figure 2C:
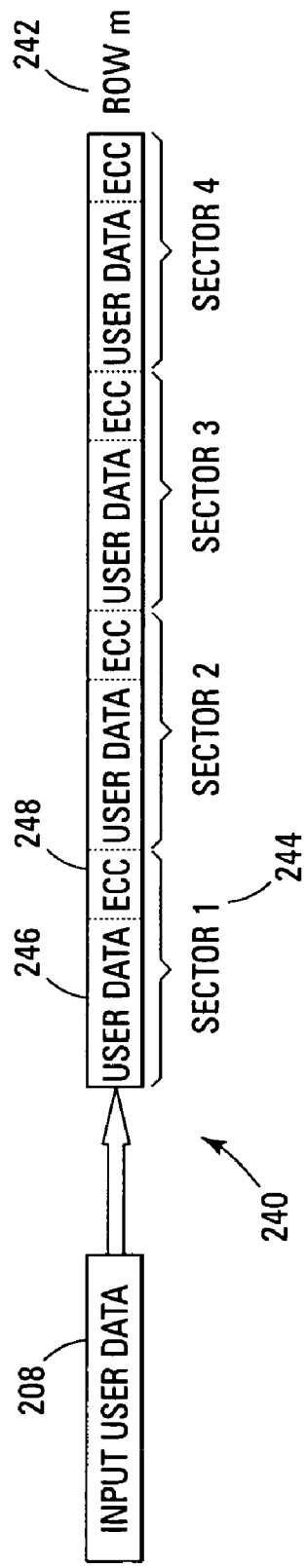

FIGS. 2A and 2C detail prior art encoding 200, 240 of user data into a sector of a Flash memory array. In FIG. 2A, a data segment 208 is shown being input into a memory array 202 (or into an erase block N 202 of a memory array). The memory array 202 contains a series of rows, each row containing a user data area 204 and an overhead data area 206. The overhead data 206 of each row typically stores one or more ECC codes that are generated for the data segment 208 that is stored in the user data area 204. As the data segment 208 is input to the memory array 202 it is stored un-encoded in the user data area 212 of a selected row m 210 in a plaintext format. An ECC code is also generated for the input data segment 208 and stored in the overhead data area 214 of the selected row m 210 to allow for detection and correction of errors in the data segment 208 when it is read at a later time.

In FIG. 2C, a data segment 208 is shown being input into a memory row 242 of a memory array. As stated above, many memories support multiple logical sectors or data words within a single physical row page (also known as the physical sector). In particular, NAND architecture Flash memories typically utilize this approach due to their generally higher memory cell density and larger row page sizes. The memory row 242 contains multiple data sectors 244, each data sector 244 having a user data area 246 and an overhead data section 248. The overhead data 248 of each data sector 244 typically stores one or more ECC codes that are generated for the data segment 208 that is stored in the user data area 246. As the data segment 208 is input to the memory row 242 it is stored un-encoded in the user data area 246 of a selected data sector 244 in a plaintext format. An ECC code is also generated for the input data segment 208 and stored in the overhead data area 248 of the selected data sector 244 to allow for detection and correction of errors in the data segment 208 when it is accessed.

In an example implementation, the row page 242 of FIG. 2C contains 2112 bytes of data (4×512 bytes user data+4×8 bytes ECC+32 bytes for overhead) and is formatted to contain four logical sectors 244 having a user data area 246 of 512-bytes each, wherein logical operating system (OS) sectors of 512 bytes each or multiple logically addressed data words can be stored within each logical sector 244. In addition, space is provided following each 512-byte user data area 246 for the associated overhead data area 248 containing an ECC code of 8 bytes each. A further 32 bytes (not shown) is reserved for use by the EBM firmware or other system level usage. The four logical sectors 244 are sequentially addressed N, N+1, N+2, and N+3, where N is a base logical sector address for the row page 242. The overhead data areas/ECC codes 248 of the physical page 242 are also sequentially addressed N, N+1, N+2, and N+3 to correspond with their associated logical sector 244 of the row page 242. Each overhead/ECC code area 248 follows the logical sector 244 and user data area 246 it is associated with within the row page 242 (sector N, ECC N, sector N+1, ECC N+1, etc). It is noted that the row page 242 is for illustration purposes and that other row page sector formats of differing data sizes, numbers of logical sectors/data words, and relative positioning of sectors are possible.

Figure 2D:
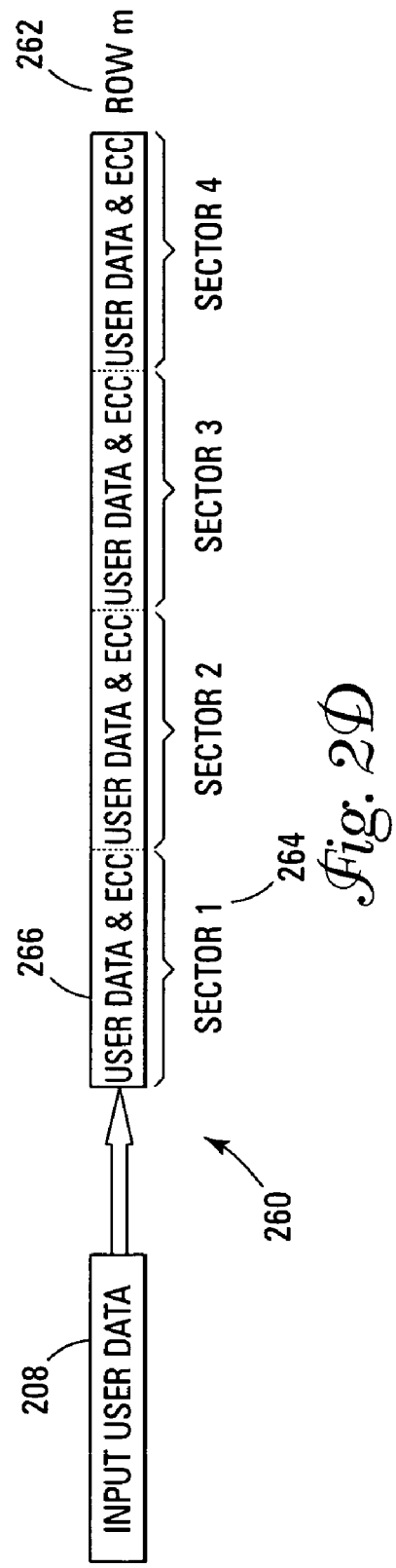

FIGS. 2B and 2D detail encoding 220, 260 of user data into a sector of a Flash memory array in accordance with embodiments of the present invention. In FIG. 2B, a data segment 208 is shown being input into a memory array 222 (or into an erase block N 222 of a memory array). The memory array 222 contains a series of rows, each row containing a data area 224 wherein the non-systematically ECC encoded user data is stored. As the data segment 208 is input to the memory array 222 the data segment 208 is non-systematically encoded with an embedded ECC code. The non-systematically ECC encoded data segment is then stored in its encoded form in the data area 228 of a selected row m 226. No separate ECC code is generated and stored. The stored non-systematically ECC encoded data segment in the data area 228 of row m 226 is then un-encoded to output original data segment 208 and to allow for detection and correction of errors in the stored ECC encoded data segment.

In FIG. 2D, a data segment 208 is shown being input into a memory row 262 of a memory array with multiple logical sectors or data words within a single physical row page 262. Each of the data sectors 264 of the row page 262 having a data area 266. As the data segment 208 is input to a selected data sector 264 of the row page 262, the data segment 208 is non-systematically encoded with an embedded ECC code. The non-systematically ECC encoded data segment is then stored in its encoded form in the data area 266 of the selected data sector 264. No separate ECC codes are generated and stored. The stored ECC encoded data segment in the data area 266 of the selected data sector 264 is then un-encoded to output original data segment 208 and to allow for detection and correction of errors in the stored ECC encoded data segment.

In an example implementation, the row page 262 of FIG. 2D contains 2112 bytes of data and is formatted to contain four logical sectors 264 having a data area 266 of 520-bytes each (or 518-bytes each in one embodiment, due the efficient coding of the non-systematic ECC) to store an encoded 512-byte data segment 208 and its ECC encoding. A further 32 bytes (not shown) is reserved for use by the EBM firmware or other system level usage. The four logical sectors 264 are sequentially addressed N, N+1, N+2, and N+3, where N is a base logical sector address for the row page 262. It is noted that the row page 262 is for illustration purposes and that other row page sector formats of differing data sizes, numbers of logical sectors/data words, and relative positioning of the sectors are possible.

Figure 3A:
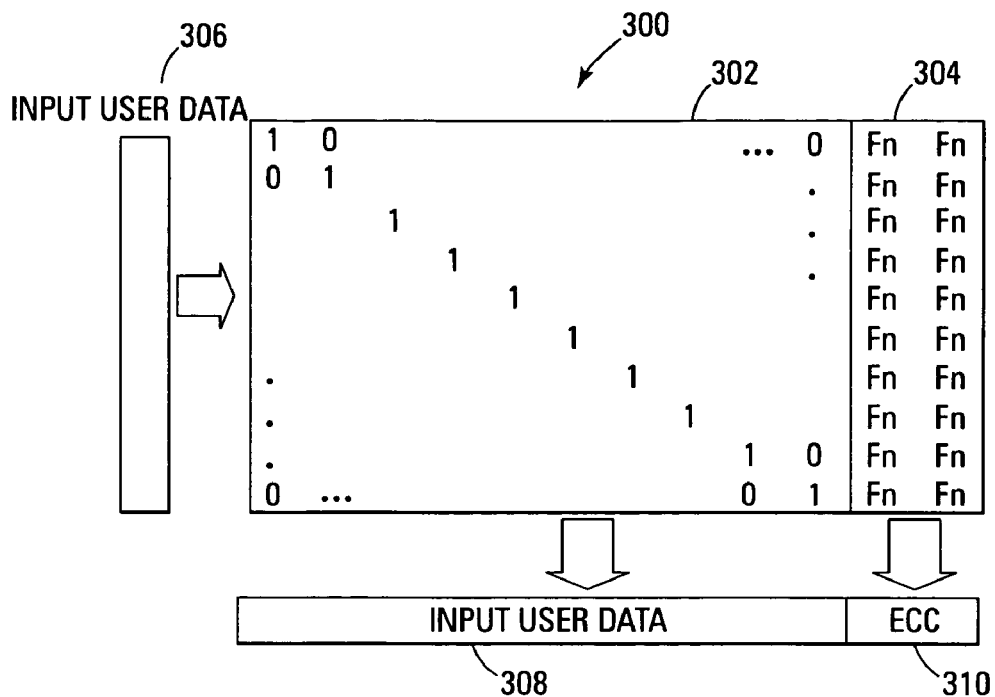
FIG. 3A details a transform matrix of a prior art encoding of input user data to stored user data and ECC.

FIG. 3A details a prior art transform matrix 300 for encoding a data segment into a data segment and associated ECC code. In FIG. 3A, a user data segment 306 is input to a transform matrix 300 having a square core matrix 302 that has the same number of outputs as inputs (a M data word by M square matrix, where M is the number of data words in the input user data segment 306), and an ECC generation matrix that contains the ECC generation functions (which vary depending on the block encoding method) and has inputs that match the number of data words of the input user data segment 306 and outputs that match the number of ECC code data words (a M data word by N data word matrix, where N is the number of generated ECC code data words). After the user data segment 306 is input, the core matrix 302 of the transform matrix 300 outputs 308 the original input data segment 306, and the ECC generation matrix 304 outputs the associated ECC code 310 to be stored in the memory.

Figure 3B:
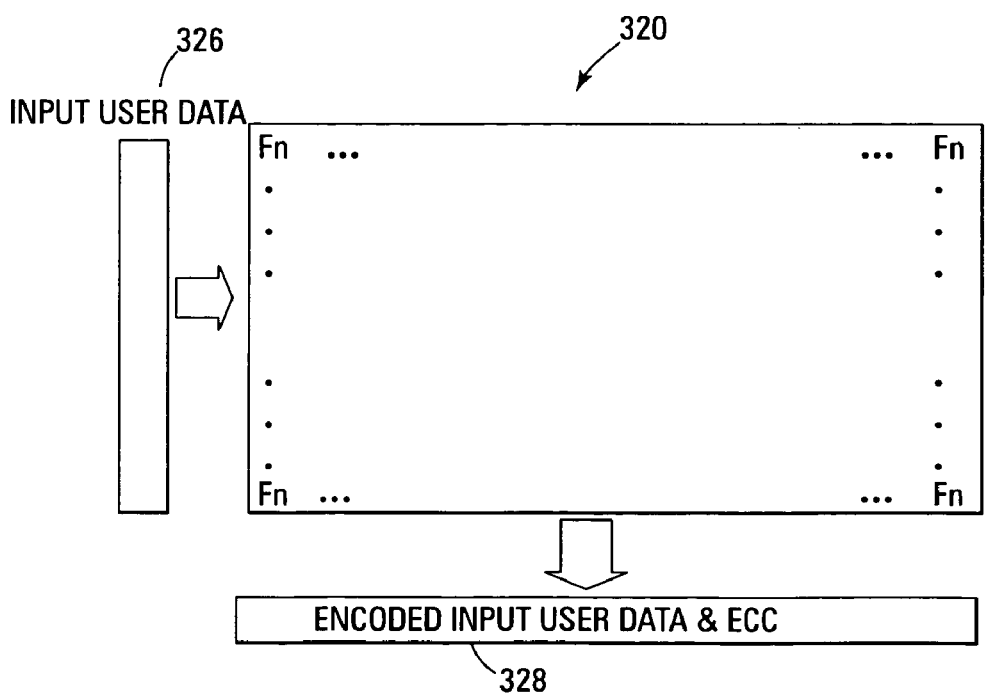
FIG. 3B details a transform matrix of an encoding of input user data to stored user data and ECC in accordance with embodiments of the present invention.

FIG. 3B details a transform matrix for encoding a data segment to a non-systematically encoded data segment having an embedded ECC in accordance with an embodiment of the present invention. In FIG. 3B, a user data segment 326 is input to a transform matrix 320 having a different number of outputs as inputs (a M data word by N data word non-square matrix, where M is the number of data words in the input user data segment 326 and N is the number of output data words). After the user data segment 306 is input, the transform matrix 320 outputs an encoded data and ECC segment 328, which contains the encoded input data and a distributed ECC and does not contain the original input data segment 326, for storage in the memory.

The prior art transform matrix 300 of FIG. 3A for encoding a separate ECC code to input user data contains a core matrix 302 which is of a type known as a "unity matrix", having 1's on the diagonal and 0's elsewhere. With a prior art unity core matrix 302, the original input data segment 306 is output 308 unchanged along with the generated ECC code 310, thus they encode systematic ECC and data segments. Any other transform matrix 320, which contains a core matrix 302 with values/functions other than just 1's on the diagonal and 0's elsewhere, is not a unity matrix. Embodiments of the present invention utilize transform matrices that do not contain core unity matrices 302, thus they are non-systematic and generate non-systematically ECC encoded data segments where the original input data 306 is encoded and not stored in its original form. Additionally, by manipulation of the values/formulas of the transform matrix, embodiments of the present invention can allow the generated ECC codes to be distributed, moved, or localized in any area of the encoded output data 328.

Figure 4A:
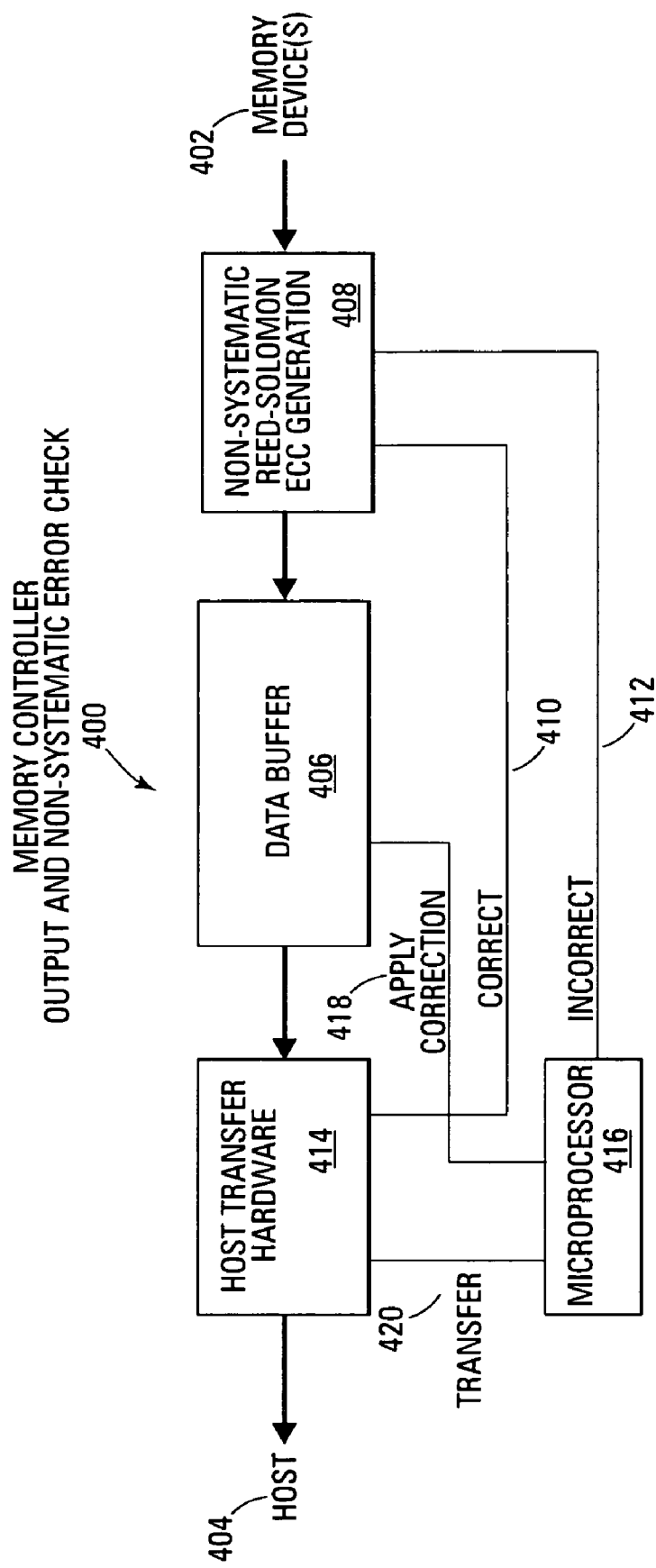
FIGS. 4A and 4B detail Flash memory controller outputs with ECC error check and correction circuits in accordance with embodiments of the present invention.
Figure 4B:
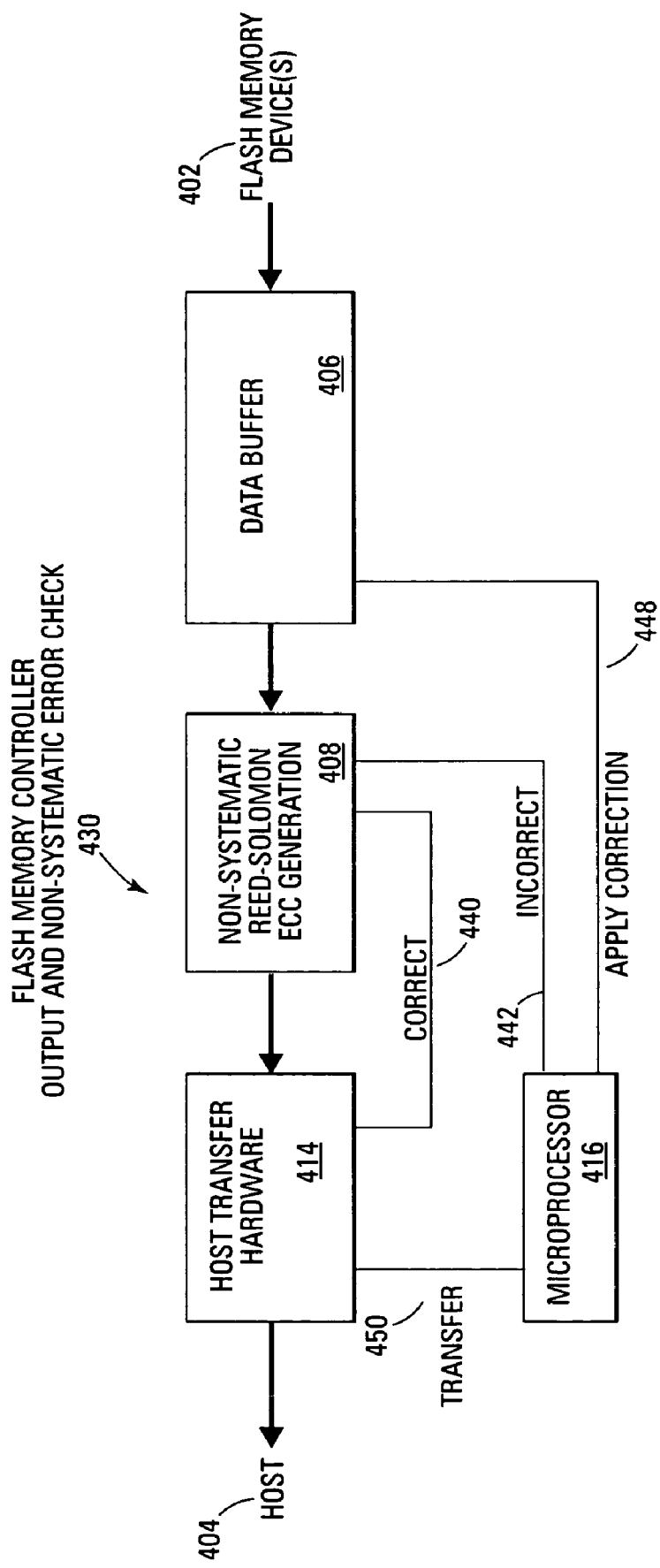

FIGS. 4A and 4B detail simplified Flash memory controller outputs with ECC error check and correction circuits in accordance with embodiments of the present invention. In FIG. 4A, a memory controller 400 is coupled through a memory interface 402 to one or more Flash memory devices and through a host interface 404 to an external host (not shown). In the memory controller 400, Reed-Solomon ECC generator/checker hardware 408 is coupled to serially receive a selected data block that is serially read through the memory interface 402 from a selected Flash memory device. The Reed-Solomon ECC generator/checker 408 decodes the non-systematic ECC encoded data block and checks it for errors. The Reed-Solomon ECC generator/checker hardware 408 is coupled to a data buffer 406 to store the un-encoded data block before it is transferred from the memory controller through the host interface 404 under control of the host transfer hardware 414. Once the data block is un-encoded and evaluated, the Reed-Solomon ECC generator/checker hardware 408 signals 410 to the host transfer hardware 414 to start the data transfer if the data block is correct (the data block ECC codes have been generated and evaluated correctly).

If the non-systematically ECC encoded data block is corrupted (the generated data block ECC codes have evaluated incorrectly) the Reed-Solomon ECC generator/checker hardware 408 signals 412 a (typically internal) microprocessor or dedicated ECC correction hardware 416 to correct the errors by utilizing a Reed-Solomon ECC correction algorithm. The microprocessor 416 solves the Reed-Solomon polynomial to determine the bits to be corrected and applies the correction 418 to the un-encoded data block contents held in the data buffer 406. After applying the correction to the data buffer 406, the microprocessor 416 signals 420 the host transfer hardware 414 to begin transferring the data block from the data buffer 406 out through the host interface 404. In an alternative embodiment, the microprocessor re-reads the data from the selected data block and applies the correction to the incoming data stream before it is evaluated by the Reed-Solomon ECC generator/checker hardware 408.

In FIG. 4B, a memory controller 430 is coupled through a memory interface 402 to one or more Flash memory devices and through a host interface 404 to an external host (not shown). In the memory controller 430, a data buffer 406 is coupled to serially receive and store a selected data block that is serially read through the memory interface 402 from a selected Flash memory device. A Reed-Solomon ECC generator/checker 408 is coupled to the data buffer 406 and decodes the non-systematic ECC encoded data block and checks it for errors as it is being transferred from the memory controller 430 through the host interface 404 under control of the host transfer hardware 414. Once the data block is un-encoded and evaluated, the Reed-Solomon ECC generator/checker hardware 408 optionally signals 440 to the host transfer hardware 414 that the data block is correct (the data block ECC codes have been generated and evaluated correctly).

If the non-systematically ECC encoded data block is corrupted (the generated data block ECC codes have evaluated incorrectly) the Reed-Solomon ECC generator/checker hardware 408 signals 442 a (typically internal) microprocessor or dedicated ECC correction hardware 416 to cancel/abort the transfer of the data block and correct the errors by utilizing a Reed-Solomon ECC correction algorithm. The microprocessor 416 solves the Reed-Solomon polynomial to determine the bits to be corrected and applies the correction 448 to the encoded data block contents still held in the data buffer 406. After applying the correction to the data buffer 406, the microprocessor 416 signals 450 the host transfer hardware 414 to begin transferring the data block from the data buffer 406 through the Reed-Solomon ECC generator/checker hardware 408 and host interface 404.

It is noted that the non-systematic ECC encoding and error detection and correction in memory embodiments of the present invention can apply to other memory types and, in particular, to non-volatile memory types including, but not limited to, polymer memory, FeRAM, OUM, NROM, and MRAM and should be apparent to those skilled in the art with the benefit of the present invention.

Because all the cells in an erase block of a Flash memory device are generally erased all at once, one cannot directly rewrite a Flash memory cell without first engaging in a block erase operation. EBM, typically under the control of an internal state machine, an external Flash memory controller, or software driver, provides an abstraction layer for this to the host (a processor or an external memory controller), allowing the Flash device to appear as a freely rewriteable device, including, but not limited to, managing the logical address to physical erase block translation mapping for reads and writes, the assignment of erased and available erase blocks for utilization, and the scheduling erase blocks that have been used and closed out for block erasure. Erase block management also allows for load leveling of the internal floating gate memory cells to help prevent write fatigue failure. Write fatigue is where the floating gate memory cell, after repetitive writes and erasures, no longer properly erases and removes charge from the floating gate. Load leveling procedures increase the mean time between failure of the erase block and Flash memory device as a whole.

Many of the modern computer operating systems, such as "DOS" (Disk Operating System), were developed to support the physical characteristics of hard drive structures; supporting file structures based on heads, cylinders and sectors. The DOS software stores and retrieves data based on these physical attributes. Magnetic hard disk drives operate by storing polarities on magnetic material. This material is able to be rewritten quickly and as often as desired. These characteristics have allowed DOS to develop a file structure that stores files at a given location which is updated by a rewrite of that location as information is changed. Essentially all locations in DOS are viewed as fixed and do not change over the life of the disk drive being used therewith, and are easily updated by rewrites of the smallest supported block of this structure. A sector (of a magnetic disk drive) is the smallest unit of storage that the DOS operating system supports. In particular, a sector has come to mean 512 bytes of information for DOS and most other operating systems in existence. Flash memory systems that emulate the storage characteristics of hard disk drives are preferably structured to support storage in 512 byte blocks along with additional storage for overhead associated with mass storage, such as ECC bits, status flags for the sector or erase block, and/or redundant bits.

In many modern Flash memory device implementations, the host interface and erase block management routines additionally allow the Flash memory device to appear as a read/write mass storage device (i.e., a magnetic disk) to the host. One such approach is to conform the interface to the Flash memory to be identical to a standard interface for a conventional magnetic hard disk drive allowing the Flash memory device to appear as a block read/write mass storage device or disk. This approach has been codified by the Personal Computer Memory Card International Association (PCMCIA), Compact Flash (CF), and Multimedia Card (MMC) standardization committees, which have each promulgated a standard for supporting Flash memory systems or Flash memory "cards" with a hard disk drive protocol. A Flash memory device or Flash memory card (including one or more Flash memory array chips) whose interface meets these standards can be plugged into a host system having a standard DOS or compatible operating system with a Personal Computer Memory Card International Association—Advanced Technology Attachment (PCMCIA-ATA) or standard ATA interface. Other additional Flash memory based mass storage devices of differing low level formats and interfaces also exist, such as Universal Serial Bus (USB) Flash drives.

Figure 5A:
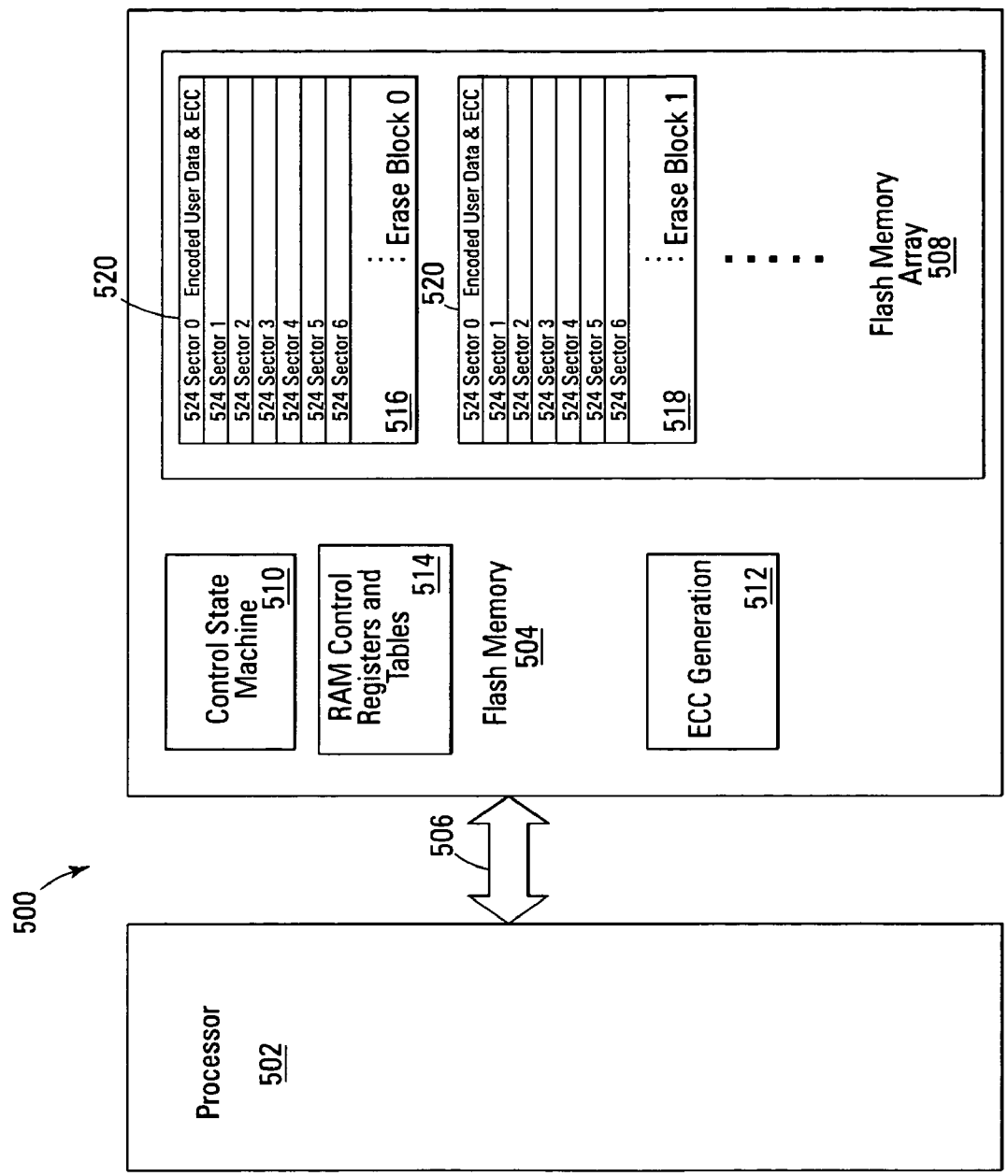
FIGS. 5A and 5B detail memory systems with memory and memory controllers in accordance with embodiments of the present invention.

FIG. 5A is a simplified diagram of a system 500 that incorporates a Flash memory device 504 embodiment of the present invention. In the system 500 of FIG. 5A, the Flash memory 504 is coupled to a processor 502 with an address/data bus 506. Internally to the Flash memory device, a control state machine 510 directs internal operation of the Flash memory device; managing the Flash memory array 508 and updating RAM control registers and tables 514. The Flash memory array 508 contains floating gate memory cells arranged in a sequence of erase blocks 516, 518. Each erase block 516, 518 contains a series of physical pages, each page containing one or more logical sectors 524 (shown here for illustration purposes as a single logical sector 524 per physical page/row) that contain a user data space 520 and a control/overhead data space 522. The overhead data space 522 contains overhead information for operation of the sector 520, such as an error correction code (not shown), status flags, or an erase block management data field area (not shown). The RAM control registers and tables 514 are loaded at power up from the non-volatile erase block management registers and tables (not shown) by the control state machine 510. The user data space 520 in each logical sector 524 is typically 512 bytes long. It is noted that other interfaces to the Flash memory 504 and formats for the erase blocks 516, 518, physical pages, and sectors 524 are possible and should be apparent to those skilled in the art with benefit of the present disclosure. In FIG. 5A, the Flash memory 504 contains ECC generation and checking hardware 512 incorporating embodiments of the present invention.

Figure 5B:
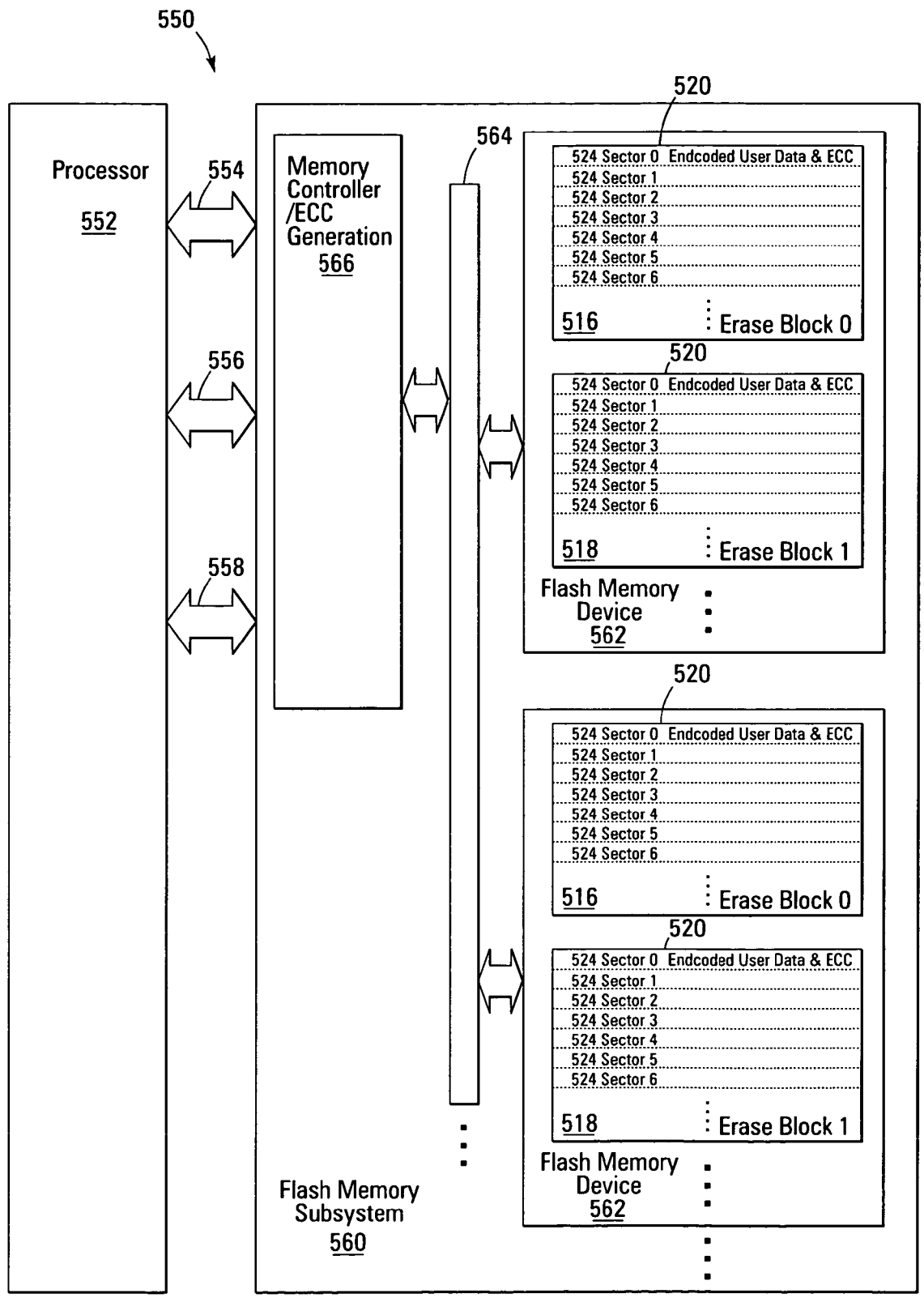

FIG. 5B is a simplified diagram of another system 550 that incorporates a Flash memory system 560 embodiment of the present invention. In the system 550 of FIG. 5B, the Flash memory system 560, such as a memory system or Flash memory card, is coupled to a processor 552 with an address 554, control 556, and data bus 558. Internal to the Flash memory system 560, a memory controller 566 directs internal operation of the Flash memory system 560; managing the Flash memory devices 562, directing data accesses, updating internal control registers and tables (not shown), and/or directing operation of other possible hardware systems (not shown) of the Flash memory system 560. The memory controller 566 has an internal ECC generation and checking hardware (not shown) that incorporates embodiments of the present invention. The memory controller 566 may optionally incorporate a small local embedded processor to help manage the Flash memory system 560. The memory controller 566 is coupled to and controls one or more Flash memory devices 562 via an internal control bus 564. It is noted that other architectures Flash memory systems 560, external interfaces 554, 556, 558, and manners of coupling the memory controller 566 to the Flash memory devices 562, such as directly coupled individual control busses and signal lines, are possible and should be apparent to those skilled in the art with benefit of the present disclosure.

The Flash memory devices 562 each contain a sequence of erase blocks 516, 518 in their internal memory arrays. Each erase block 516, 518 contains a series of physical pages, each physical page having one or more logical sectors 524 that contain a user data space 520 and a control/overhead data space 522 (shown here for illustration purposes as a single logical sector 524 per physical page/row). The overhead data space 522 contains an ECC code (not shown) and other overhead information for operation of the logical sector 520, such as status flags, or an erase block management data field area (not shown).

It is noted that the ECC checking and correction of Flash memory embodiments of the present invention can apply to other non-volatile memory types including, but not limited to, polymer memory, FeRAM, OUM, NROM, and MRAM and should be apparent to those skilled in the art with the benefit of the present invention.

It is also noted that other ECC checking and correction sequences and circuits in memory embodiments of the present invention are possible and should be apparent to those skilled in the art with benefit of the present disclosure.

CONCLUSION

Improved memory devices, circuitry, and data methods have been described that facilitate the detection and correction of data in memory systems or devices by encoding the data bits of a memory row or block in a non-systematic ECC code. This allows memory embodiments of the present invention to utilize reduced complexity error detection and correction hardware and/or routines to efficiently detect and correct corrupted user data in a segment of memory, such as a sector, word line row, or erase block. Additionally, in embodiments of the present invention user data is not stored in a plaintext format in the memory array, allowing for an increased level of data security. Further, in embodiments of the present invention, the ECC code is distributed throughout the stored data in the memory segment, increasing the robustness of the ECC code and its resistance to damage or data corruption.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A memory system, comprising:
   at least one memory device, wherein the at least one memory device contains a memory array with a plurality of memory cells arranged in one or more data segments;
   a memory control circuit coupled to the at least one memory device, wherein the memory control circuit comprises,
   a data buffer, a host transfer circuit coupled to the data buffer, and an ECC generator/checker circuit, wherein ECC generator/checker circuit is adapted to receive and decode a non-systematic ECC encoded data segment from the at least one memory device and output to the data buffer; and wherein the memory system is adapted to detect and correct errors in the non-systematic ECC encoded data segment as it is read from the at least one memory device.

2. The memory system of claim 1, wherein the at least one memory device is a non-volatile memory device.

3. The memory system of claim 2, wherein the at least one non-volatile memory device of the memory system is one of a NOR architecture Flash memory device, a NAND architecture Flash memory device, a Polymer memory device, a Ferroelectric Random Access Memory (FeRAM) memory device, a Ovionics Unified Memory (OUM) memory device, Nitride Read Only Memory (NROM) memory device, and a Magnetoresistive Random Access Memory (MRAM) memory device.

4. The memory system of claim 1, wherein at least one memory device is a DRAM memory device.

5. The memory system of claim 1, wherein the encoding of the non-systematic ECC encoded data segment is one of a Hamming code, a Reed-Solomon (R-S) code, a Bose-Chaudhuri-Hochquenghem (BCH) code, a circular redundancy code (CRC-32), a Golay code, a Reed-Muller code, a Goppa code, and a Denniston code.

6. The memory system of claim 1, wherein the memory system is adapted to encode an input data segment received on the host transfer circuit into a non-systematic ECC encoded data segment and store the encoded data segment in the at least one memory device.

7. The memory system of claim 1, wherein the memory system is adapted to detect and correct errors in one of the decoded data segment held in the data buffer, the decoded data segment as it is transferred through the host transfer circuit, and in a serialized version of the non-systematic ECC encoded data segment as it is re-read from the at least one memory device.

8. The memory system of claim 1, wherein the memory system is adapted to correct detected errors in the non-systematic ECC encoded data segment by executing a non-systematic error correction algorithm in a processor or a hardware correction circuit.

9. A memory device comprising:

a memory array containing a plurality of memory cells arranged into a plurality of segments;

a data buffer;

a host transfer circuit coupled to the data buffer;

an ECC generator/checker circuit, wherein ECC generator/checker circuit is adapted to receive and decode a non-systematic ECC encoded data segment from the memory array and output to the data buffer; and wherein the memory device is adapted to detect and correct errors in the non-systematic ECC encoded data segment as it is read from the memory array.

10. The memory device of claim 9, wherein the memory array is a non-volatile memory array.

11. The memory device of claim 10, wherein the non-volatile memory array is one of a NOR architecture Flash memory array, a NAND architecture Flash memory array, a Polymer memory array, a Ferroelectric Random Access Memory (FeRAM) memory array, a Ovionics Unified Memory (OUM) memory array, Nitride Read Only Memory (NROM) array, and a Magnetoresistive Random Access Memory (MRAM) memory array.

12. The memory device of claim 9, wherein the encoding of the non-systematic ECC encoded data segment is one of a Hamming code, a Reed-Solomon (R-S) code, a Bose-Chaudhuri-Hochquenghem (BCH) code, a circular redundancy code (CRC-32), a Golay code, a Reed-Muller code, a Goppa code, and a Denniston code.

13. The memory device of claim 9, wherein the memory array contains a plurality of memory cells arranged into a plurality of sectors in a plurality of erase blocks, wherein each erase block of the plurality of erase blocks contains a plurality of physical row pages, each physical row page containing one or more data sectors.

14. The memory device of claim 9, wherein the memory device is adapted to detect and correct errors in the decoded data segment held in the data buffer.

15. The memory device of claim 9, wherein the memory device is adapted to detect and correct errors in the decoded data segment as it is transferred through the host transfer circuit.

16. The memory device of claim 9, wherein the memory device is adapted to detect and correct errors in a serialized version of the non-systematic ECC encoded data segment as it is re-read from the memory array.

17. The memory device of claim 9, wherein the memory device is adapted to encode an input data segment received on the host transfer circuit into a non-systematic ECC encoded data segment and store the encoded data segment in the memory array.

18. The memory system of claim 9, wherein the memory device is adapted to correct detected errors in the non-systematic ECC encoded data segment by executing a non-systematic error correction algorithm in a processor or a hardware correction circuit.

19. A Flash memory system, comprising:

at least one Flash memory device, wherein the at least one Flash memory device contains a memory array with a plurality of floating gate memory cells arranged into a plurality of sectors in a plurality of erase blocks, wherein each erase block of the plurality of erase blocks contains a plurality of physical row pages, each physical row page containing one or more data sectors;

a Flash memory control circuit coupled to the at least one Flash memory device, wherein the Flash memory control circuit comprises, a data buffer, a host transfer circuit coupled to the data buffer, an ECC generator/checker circuit, wherein ECC generator/checker circuit is adapted to receive and decode a non-systematic ECC encoded data sector from the at least one Flash memory device and output to the data buffer; and wherein the Flash memory system is adapted to detect and correct errors in the non-systematic ECC encoded data sector as it is read from the at least one memory device.

20. The memory system of claim 19, wherein the at least one Flash memory device of the memory system is a one of NAND Flash memory device and a NOR Flash memory device.

21. The memory system of claim 19, wherein the encoding of the non-systematic ECC encoded data sector is one of a Hamming code, a Reed-Solomon (R-S) code, a Bose-Chaudhuri-Hochquenghem (BCH) code, a circular redundancy code (CRC-32), a Golay code, a Reed-Muller code, a Goppa code, and a Denniston code.

22. A memory controller comprising:
a host interface;
a memory device interface for one or more memory devices, wherein each of the one or more memory devices has a plurality of segments;
a data buffer coupled to the memory device interface;
a host transfer circuit coupled to the data buffer and to the host interface;
an ECC generator/checker circuit, wherein ECC generator/checker circuit is adapted to receive and decode a selected non-systematic ECC encoded data segment from the at least one memory device and output to the data buffer; and
wherein the memory controller is adapted to detect and correct errors the selected non-systematic ECC encoded data segment as it is read from the at least one memory device.

23. The memory controller of claim 22, wherein the memory controller is adapted to correct the read data segment in one of the data buffer and the host transfer hardware.

24. The memory controller of claim 22, wherein the memory controller is adapted to detect and correct errors in the selected non-systematic ECC encoded data segment as it is re-read through the memory device interface.

25. The memory controller of claim 22, wherein the memory controller is adapted to encode an input data segment received on the host interface into a non-systematic ECC encoded data segment.

26. The memory controller of claim 22, wherein the memory controller is a non-volatile memory controller.

27. The memory controller of claim 26, wherein the non-volatile memory controller is adapted to present an interface that is compatible with a mass storage device.

28. The memory controller of claim 22, wherein the memory controller further comprises a microprocessor.

29. The memory controller of claim 28, wherein the memory controller is adapted to correct detected errors in the non-systematic ECC encoded data segment by executing a non-systematic error correction algorithm in the microprocessor.

30. The memory controller of claim 22, wherein the encoding of the non-systematic ECC encoded data segment is one of a Hamming code, a Reed-Solomon (R-S) code, a Bose-Chaudhuri-Hochquenghem (BCH) code, a circular redundancy code (CRC-32), a Golay code, a Reed-Muller code, a Goppa code, and a Denniston code.

31. A system comprising:
a host coupled to a memory system, wherein the memory system comprises:
at least one memory device, wherein the at least one memory device contains a memory array with a plurality of memory cells arranged in one or more data segments;
a memory control circuit coupled to the at least one memory device, wherein the
memory control circuit comprises,
a data buffer,
a host transfer circuit coupled to the data buffer, and
an ECC generator/checker circuit, wherein ECC generator/checker circuit is adapted to receive a non-systematic ECC encoded data segment from the at least one memory device and output to the data buffer; and
wherein the memory system is adapted to detect and correct errors in the non-systematic ECC encoded data segment as it is read from the at least one memory device.

32. The system of claim 31, wherein the host is one of a processor and an external memory controller.

33. The system of claim 31, wherein the memory system is a non-volatile memory system.

34. The system of claim 33, wherein the memory system is adapted to appear to the host as a mass storage device.

35. The system of claim 33, wherein the at least one non-volatile memory device of the memory system is one of a NOR architecture Flash memory device, a NAND architecture Flash memory device, a Polymer memory device, a Ferroelectric Random Access Memory (FeRAM) memory device, a Ovionics Unified Memory (OUM) memory device, Nitride Read Only Memory (NROM) memory device, and a Magnetoresistive Random Access Memory (MRAM) memory device.

36. The system of claim 31, wherein the encoding of the non-systematic ECC encoded data segment is one of a Hamming code, a Reed-Solomon (R-S) code, a Bose-Chaudhuri-Hochquenghem (BCH) code, a circular redundancy code (CRC-32), a Golay code, a Reed-Muller code, a Goppa code, and a Denniston code.

37. A memory system, comprising:
at least one memory device, wherein the at least one memory device contains a memory array with a plurality of memory cells arranged in one or more data segments;
a memory control circuit coupled to the at least one memory device, wherein the memory
control circuit comprises,
a data buffer coupled to receive a non-systematic ECC encoded data segment from the at least one memory device,
a host transfer circuit, and
an ECC generator/checker circuit, wherein ECC generator/checker circuit is coupled to the data buffer and to the host transfer circuit; and
wherein the ECC generator/checker is adapted to error check and decode the non-systematic ECC encoded data segment as it is transferred from the memory system through the host transfer circuit.

38. The memory system of claim 37, wherein the memory system is adapted to correct errors detected in the non-systematic ECC encoded data segment.

39. The memory system of claim 37, wherein the memory system is adapted to abort transfer of the decoded non-systematic ECC encoded data segment through the host transfer circuit when an error is detected.

40. The memory system of claim 37, wherein the at least one memory device is a non-volatile memory device.

41. The memory system of claim 40, wherein the at least one non-volatile memory device of the memory system is one of a NOR architecture Flash memory device, a NAND architecture Flash memory device, a Polymer memory device, a Ferroelectric Random Access Memory (FeRAM) memory device, a Ovionics Unified Memory (OUM) memory device, Nitride Read Only Memory (NROM) memory device, and a Magnetoresistive Random Access Memory (MRAM) memory device.

42. The memory system of claim 37, wherein the encoding of the non-systematic ECC encoded data segment is one of a Hamming code, a Reed-Solomon (R-S) code, a Bose-Chaudhuri-Hochquenghem (BCH) code, a circular redundancy code (CRC-32), a Golay code, a Reed-Muller code, a Goppa code, and a Denniston code.

* * * * *

UNITED STATES PATENT AND TRADEMARK OFFICE
CERTIFICATE OF CORRECTION

PATENT NO.        : 7,444,579 B2
APPLICATION NO. : 11/116560
DATED             : October 28, 2008
INVENTOR(S)       : Radke et al.

Page 1 of 1

It is certified that error appears in the above-identified patent and that said Letters Patent is hereby corrected as shown below:

In column 15, line 15, in Claim 22, delete "errors the" and insert -- errors in the --, therefor.

Signed and Sealed this

Third Day of March, 2009

JOHN DOLL
*Acting Director of the United States Patent and Trademark Office*